United States Patent
Christianson (10) Patent No.: US 7,107,146 B2
(45) Date of Patent: Sep. 12, 2006

(54) METHODS AND SYSTEMS FOR GENERATING A TERRAIN ELEVATION MAP IN A CARTESIAN FORMAT

(75) Inventor: Paul E. Christianson, Seattle, WA (US)

(73) Assignee: Honeywell International Inc., Morristown, NJ (US)

( * ) Notice: Subject to any disclaimer, the term of this patent is extended or adjusted under 35 U.S.C. 154(b) by 283 days.

(21) Appl. No.: 10/802,629

(22) Filed: Mar. 17, 2004

(65) Prior Publication Data

US 2005/0131630 A1  Jun. 16, 2005

Related U.S. Application Data

(60) Provisional application No. 60/528,297, filed on Dec. 10, 2003.

(51) Int. Cl.
*G01C 21/32* (2006.01)
*G01S 5/15* (2006.01)
*G05D 1/04* (2006.01)

(52) U.S. Cl. ............... 701/200; 701/4; 701/18; 342/25 A; 345/427

(58) Field of Classification Search ............ 701/3, 701/4, 8, 9, 10, 14, 18; 342/25 A, 357.12, 342/357.13; 345/427
See application file for complete search history.

(56) References Cited

U.S. PATENT DOCUMENTS

| | | | | |
|---|---|---|---|---|
| 5,086,396 A | * | 2/1992 | Waruszewski, Jr. | 701/221 |
| 5,574,649 A | * | 11/1996 | Levy | 701/207 |
| 5,995,903 A | * | 11/1999 | Smith et al. | 701/211 |
| 6,020,893 A | * | 2/2000 | Freeman | 345/428 |
| 6,216,065 B1 | * | 4/2001 | Hall et al. | 701/16 |
| 6,389,355 B1 | | 4/2001 | Teskey | |
| 6,288,721 B1 | * | 9/2001 | Donoghue et al. | 345/426 |
| 6,335,695 B1 | | 1/2002 | Kawasaki | |
| 2001/0023390 A1 | * | 9/2001 | Gia | 701/301 |
| 2002/0188386 A1 | * | 12/2002 | Day | 701/4 |
| 2004/0141170 A1 | * | 7/2004 | Jamieson et al. | 356/5.01 |

* cited by examiner

*Primary Examiner*—Tan Q. Nguyen
(74) *Attorney, Agent, or Firm*—Black Lowe & Graham pllc (57) ABSTRACT

Methods, systems, and computer program products for re-sampling terrain data in a vehicle from latitude/longitude format into a Cartesian format. The present invention permits incremental updates of the terrain elevation map as the vehicle travels. The present invention includes memory for storing terrain elevation data, a navigation component for generating aircraft position information, and a processor in communication with the memory and the navigation component. The processor retrieves terrain elevation data from the memory based on the generated aircraft position information, and generates a Cartesian coordinate-referenced terrain elevation map based on the retrieved terrain elevation data and the aircraft position information.

32 Claims, 7 Drawing Sheets

METHODS AND SYSTEMS FOR GENERATING A TERRAIN ELEVATION MAP IN A CARTESIAN FORMAT

PRIORITY CLAIM

This application claims the benefit of U.S. Provisional Application Ser. No. 60/528,297, filed Dec. 10, 2003, which is hereby incorporated by reference.

FIELD OF THE INVENTION

This invention relates generally to navigation and, more specifically, to displaying terrain elevation maps in a vehicle.

BACKGROUND OF THE INVENTION

Terrain elevation maps are frequently used in aviation for purposes of maintaining pilot spatial situation awareness, and for other purposes that include airborne radar signal processing. For display, or for processing purposes, the map of terrain is represented on a two dimensional planar display in an x/y Cartesian format, even though the terrain is superimposed on the spherically curved earth surface. Because the radius of curvature is large, and the size of the region represented by the map is small with respect to the radius of the earth, the "flat earth" representation of the terrain elevation map is acceptable.

The use of terrain elevation data in a Cartesian format is complicated by the fact that terrain data is typically provided as points uniformly sampled in latitude and longitude. It is often the practice to present terrain data in the latitude/longitude format as an approximation to the desired x/y format. This representation of terrain elevation in the latitude/longitude format is reasonably good at latitudes near the equator. However, terrain elevation data represented in the lat/long format presents some processing anomalies at other latitudes.

Typically, a terrain elevation map in an aircraft, or in any moving vehicle, represents the terrain over a limited size region in the vicinity of the vehicle. The size of the region depends on display, or other, requirements. As the vehicle moves, it is necessary to update the map data to incorporate the new terrain. If the map is maintained with an orientation referenced to true north, the reference frame of a generated map has to rotate to maintain the orientation to true north as the vehicle travels. This will occur at any latitude except at the equator. As a result, if the map is maintained referenced to north, a map update that includes this reference frame rotation must consist of re-building the entire map in order to maintain the north reference. This is necessary despite the fact that new terrain entering the mapped region may constitute a relatively small portion of the map. Re-building the entire map can result in substantial computation burden and cost.

Therefore, there exists a need to provide a terrain elevation map that does not introduce excessive distortion, and which permits an incremental update to the map as the vehicle moves that prevents the need to periodically re-build the map.

SUMMARY OF THE INVENTION

The present invention provides methods, systems, and computer program products for re-sampling terrain data in a vehicle from latitude/longitude format into a Cartesian format, to permit incremental updates of the terrain elevation map as the vehicle travels.

In one embodiment the system includes memory for storing terrain elevation data, a navigation component for generating aircraft position information, and a processor in communication with the memory and the navigation component. The processor retrieves terrain elevation data from the memory based on the generated aircraft position information, and generates a Cartesian coordinate-referenced terrain elevation map based on the retrieved terrain elevation data and the aircraft position information.

The system also includes a display processor in communication with the processor that generates a map image.

In one aspect of the invention, the navigation component includes a ground proximity warning system that generates one or more of a ground proximity caution or warning based on the generated terrain elevation map.

In another aspect of the invention, the system includes a radar system that generates a volumetric buffer based on the terrain elevation map and radar signals generated by the radar system.

BRIEF DESCRIPTION OF THE DRAWINGS

The preferred and alternative embodiments of the present invention are described in detail below with reference to the following drawings.

DETAILED DESCRIPTION OF THE PREFERRED EMBODIMENT

Figure 1:
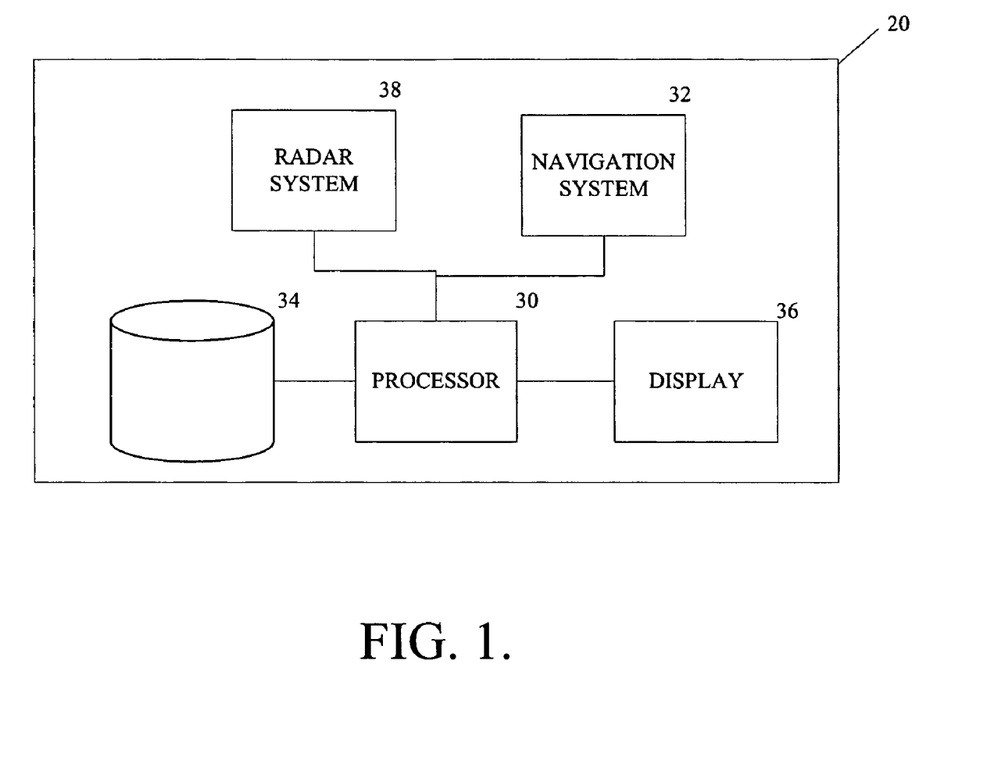
FIG. 1 is a block diagram of an exemplary system formed in accordance with the present invention.

FIG. 1 illustrates a block diagram of a vehicle 20, such as an aircraft, formed in accordance with an embodiment of the present invention. The vehicle 20 includes a processor 30 and a database 34 in data communication with the processor 30. The vehicle 20 may include one or more of a navigation system 32, a display 36 having a display processor, and a radar system 38. The navigation system 32, the display 36, and the radar system 38 are all in data communication with the processor 30 or the database 34.

The processor 30 generates a terrain elevation map by re-sampling terrain data stored in the database 34 from a latitude/longitude format into a Cartesian format based on aircraft position information received from the navigation system 32. The processor 30 also incremental updates the terrain elevation map as the vehicle 20 travels. The terrain elevation map is stored in the database 34 or transmitted to the navigation system 32, the display 36, or the radar system 38.

In one embodiment, the processor 30 is a general-purpose digital computer that interacts with the navigation system 32, the database 34, the display 36, and/or the radar system 38 and operates according to processes described below.

In one embodiment, the terrain elevation map is presented on the display 36. In another embodiment, the navigation system 32 uses the terrain elevation map for use by a ground proximity warning component or a navigation component, or for other associated purposes. In still another embodiment, the radar system 38 uses the terrain elevation map in various operations, such as radar tilt control or in generation of a volumetric radar return buffer.

Figure 2:
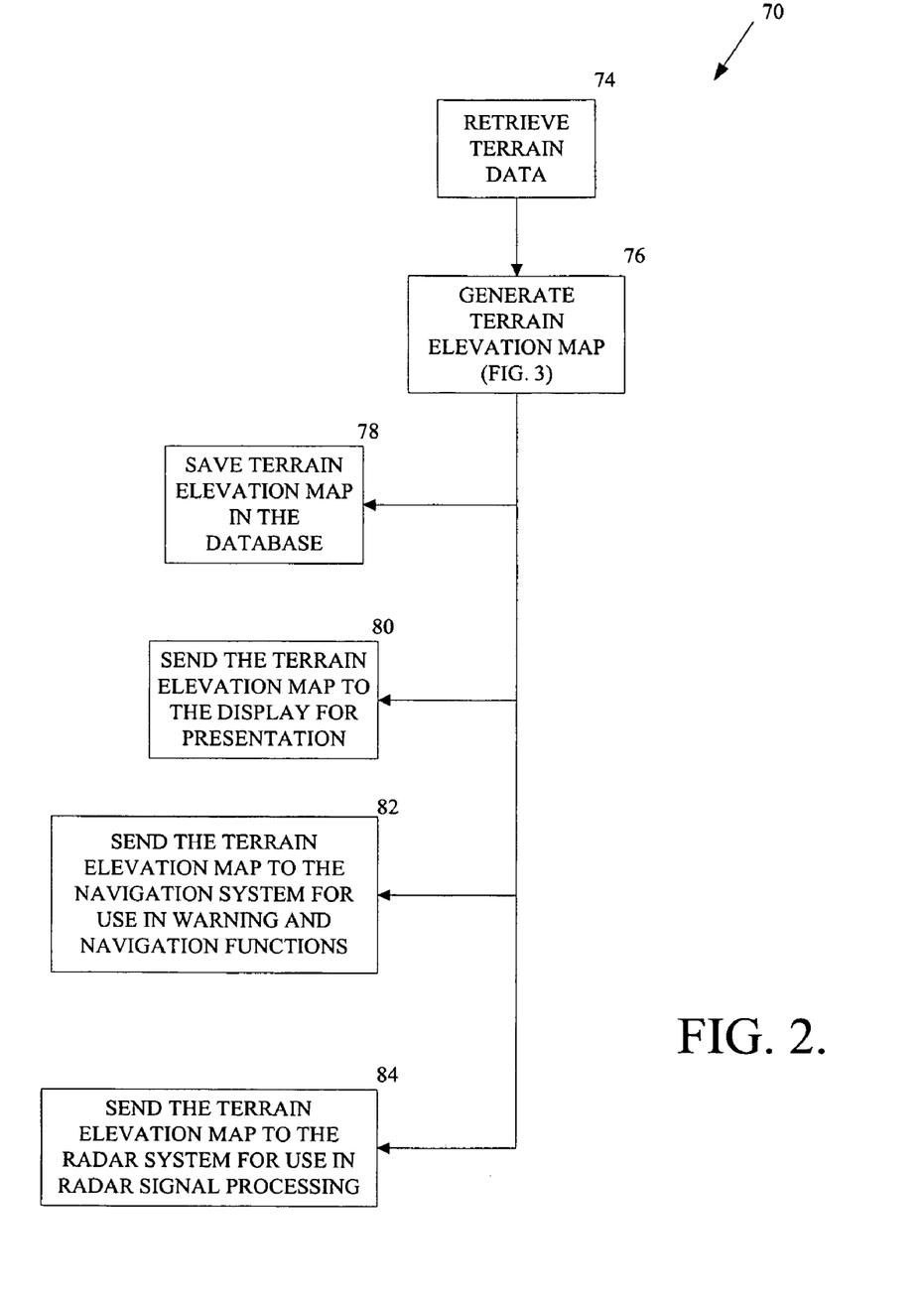
FIGS. 2–4, 6, and 7 are flow diagrams of an exemplary process performed by the system shown in FIG. 1.

FIG. 2 illustrates a flow diagram of an exemplary process 70 performed by the processor 30 (FIG. 1). First, at block 74, the processor 30 retrieves terrain elevation data from the database 34 based on aircraft position information received from the navigation system 32. Next, at block 76, the processor 30 generates a Cartesian coordinate-referenced terrain elevation map based on the retrieved terrain elevation data and aircraft position information received from the navigation system 32. Generation of the Cartesian coordinate-referenced terrain elevation map is described in more detail below in FIG. 3. The terrain elevation map is stored in the database 34, block 78, sent to the display 36 with display processor for presentation, block 80, sent to the navigation system 32 for use in warning and navigation functions, block 82, and/or sent to the radar system 38 for use in radar signal processing, block 84.

In an alternate embodiment, the terrain elevation map is transmitted from the database 34 to the navigation system 32, the display 36, or the radar system 38.

Figure 3:
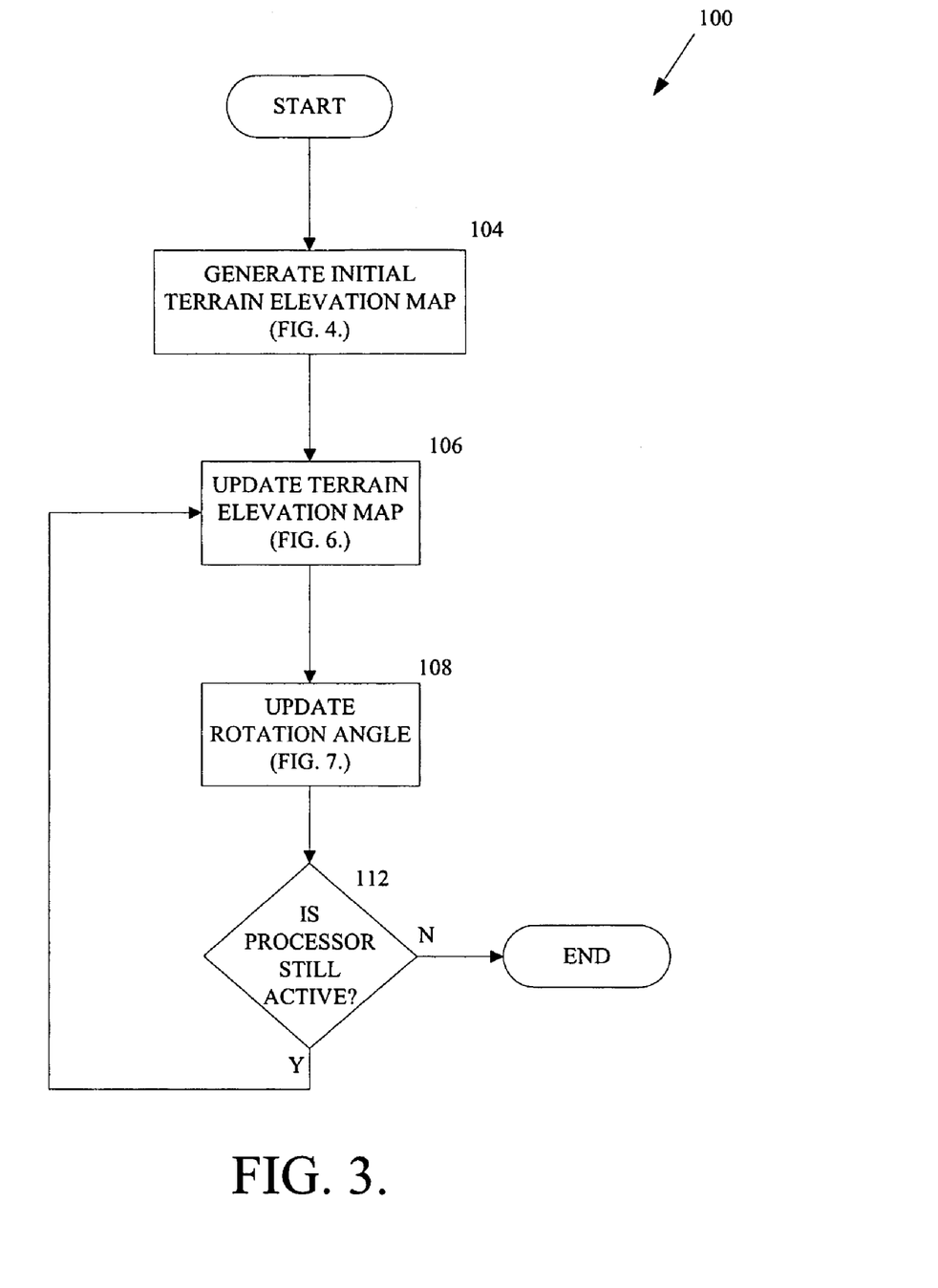

As shown in FIG. 3, a process 100 is shown for generating and updating the terrain elevation map (block 76, FIG. 2). The process 100 begins at a block 104 where an initial Cartesian coordinate-referenced terrain elevation map is generated. Generation of the initial terrain elevation map is described in more detail below in FIG. 4. Next, at a block 106, the Cartesian coordinate-referenced terrain elevation map is updated. Map updating is described in more detail below with regards to FIG. 6. At a block 108, the processor 30 updates a rotation angle. Updating of the rotation angle is described in more detail below with regards to FIG. 7. If at decision block 112 the processor 30 is still active (i.e. the processor 30 has be deactivated or requested to stop generating a terrain elevation map), the process 100 ends, otherwise, the process 100 returns to block 106. It can be appreciated that the process 100 may be terminated at any point.

Figure 4:
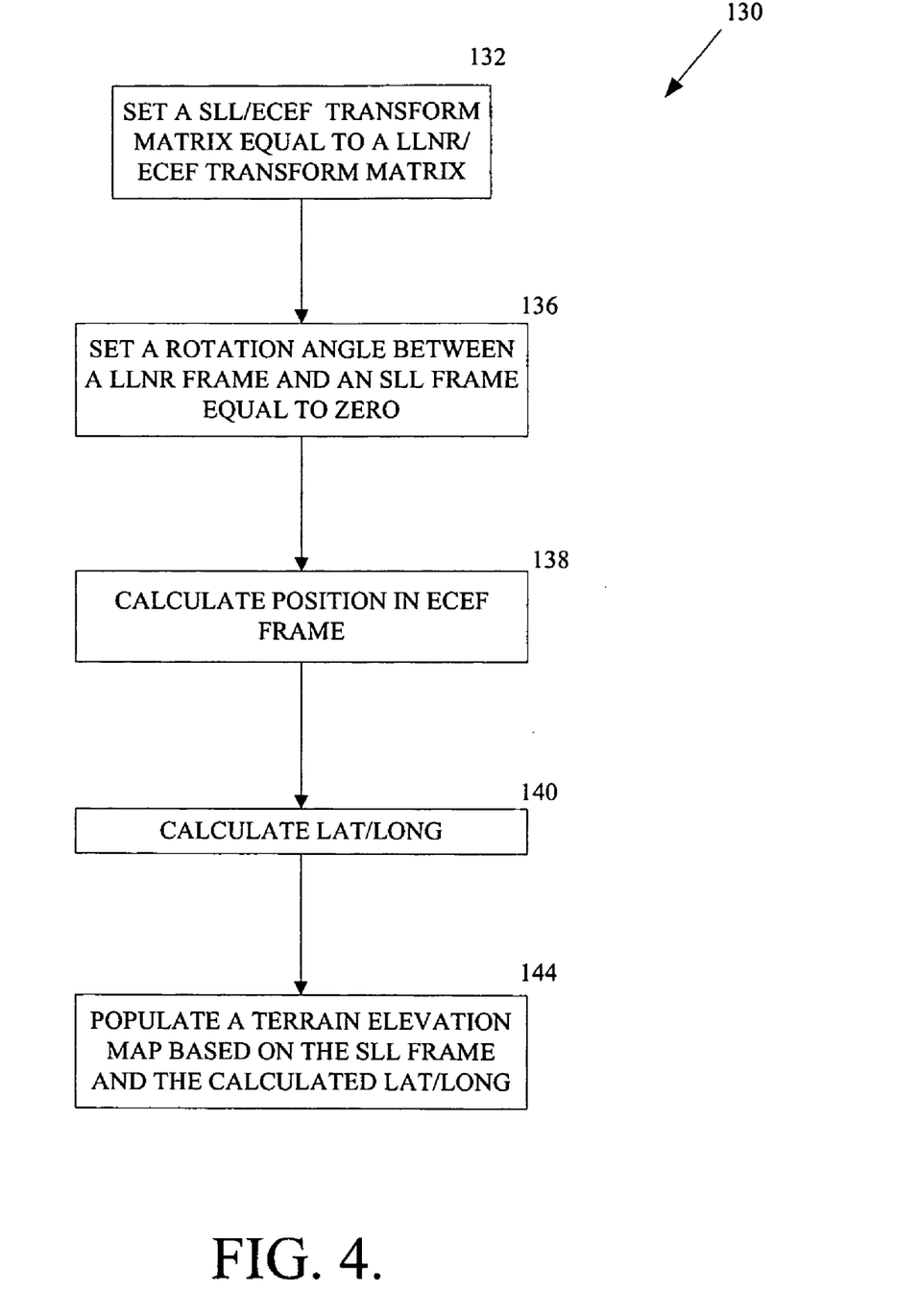
Figure 5:
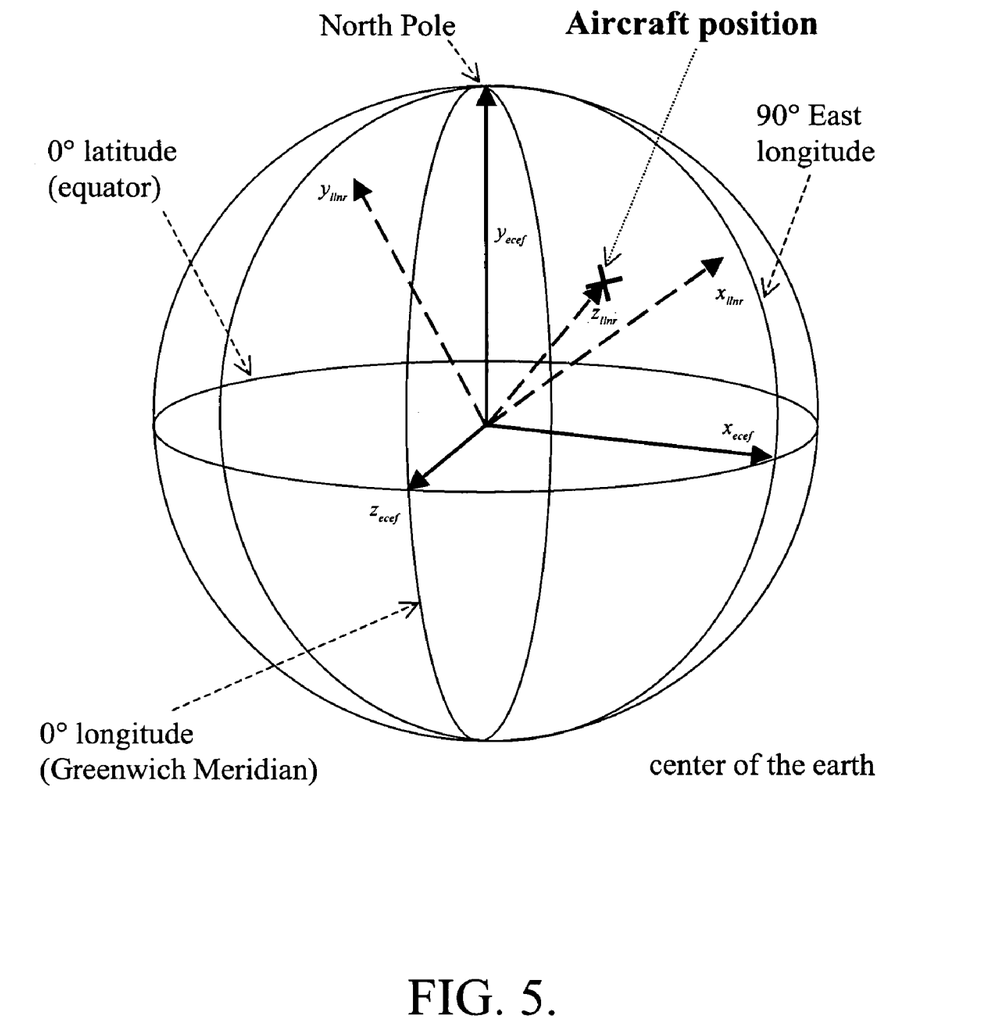
FIG. 5 is an image of reference frames on the earth.

As shown in FIG. 4, a process 130 for generating an initial terrain elevation map is illustrated. First, at a block 132, a transform matrix for transforming points in a terrain elevation map from a Earth-Centered Earth-Fixed (ECEF) frame to a Stabilized Local-Level (SLL) frame is set equal to a transform matrix for transforming points in a terrain elevation map from a Earth-Centered Earth -Fixed (ECEF) frame to a Local-Level North Referenced (LLNR) frame. FIG. 5 illustrates a geometric view of an ECEF coordinates ($x_{ecef}$, $y_{ecef}$, $z_{ecef}$) and an LLNR coordinates ($x_{llnr}$, $y_{llnr}$, $z_{llnr}$). Next, at a block 136, a rotation angle between the LLNR frame and the SLL frame is set to zero. Next, at a block 138, a position ($x_{ecef}$, $y_{ecef}$, $z_{ecef}$) is calculated for each point in the terrain elevation map in ECEF frame based on position information generated by the navigation system 32. At block 140, latitude and longitude (lat/long) are calculated for each point in the terrain elevation map in ECEF frame based on the calculated positions ($x_{ecef}$, $y_{ecef}$, $z_{ecef}$). Next, at a block 144, terrain elevation data is mapped into the terrain elevation map in SLL frame based on the calculated lat/long, the SLL transform matrix, and the stored terrain elevation data.

Figure 6:
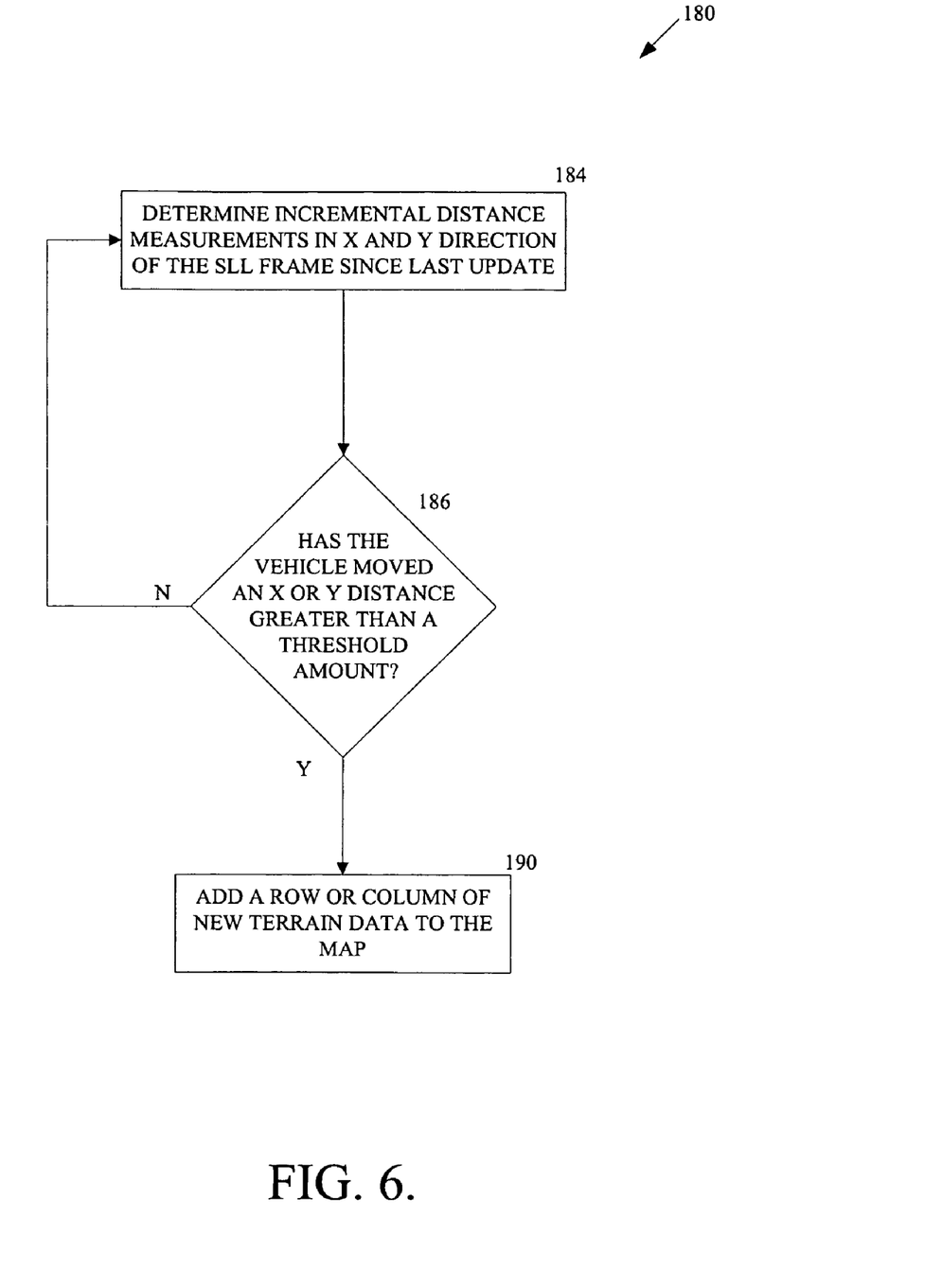

As shown in FIG. 6, a process 180 (block 106, FIG. 3) for updating the terrain elevation map produced by the process 130 is shown. First, at a block 184, incremental distance measurements in x and y direction of the SLL frame are determined based on information from the navigation system 32. At decision block 186, the processor 30 determines if the vehicle has moved an incremental x or y distance more than a threshold amount. If the vehicle has not moved an incremental x or y distance more than a threshold amount, then the process 180 returns to block 184. If the vehicle has moved an incremental x or y distance more than a threshold amount, a corresponding row or column is added to the terrain elevation map based on the present SLL transform matrix and the new row or column is populated with terrain elevation data.

The terrain elevation map is maintained in the SLL frame in a Cartesian (i.e., x/y) format. In one embodiment the terrain elevation map is maintained with the vehicle (e.g., aircraft) near the center. If the vehicle moves a distance equal to one cell in x or y (or actually in the curvilinear coordinates xi and eta), then a row or column of new terrain data is needed and a row or column is dropped off of the terrain elevation map behind the vehicle based on the direction of travel. When adding a new cell, the curvilinear coordinates of the points (cells) in the new row or column are determined. The curvilinear coordinates represent the distance along the surface of the earth from the reference point (i.e., where the SLL z-axis penetrates the surface of the earth). The curvilinear coordinates are converted into rotation angles by dividing by the radius of the earth. The position of the point in the SLL frame is calculated using the rotation angles. The position is transformed to the ECEF frame by multiplying by the SLL-to-ECEF transformation matrix. The transformed position is used to calculate the lat/long of the point. The terrain elevation data associated with the calculated lat/long is then entered into, assigned to, or associated with the point.

Figure 7:
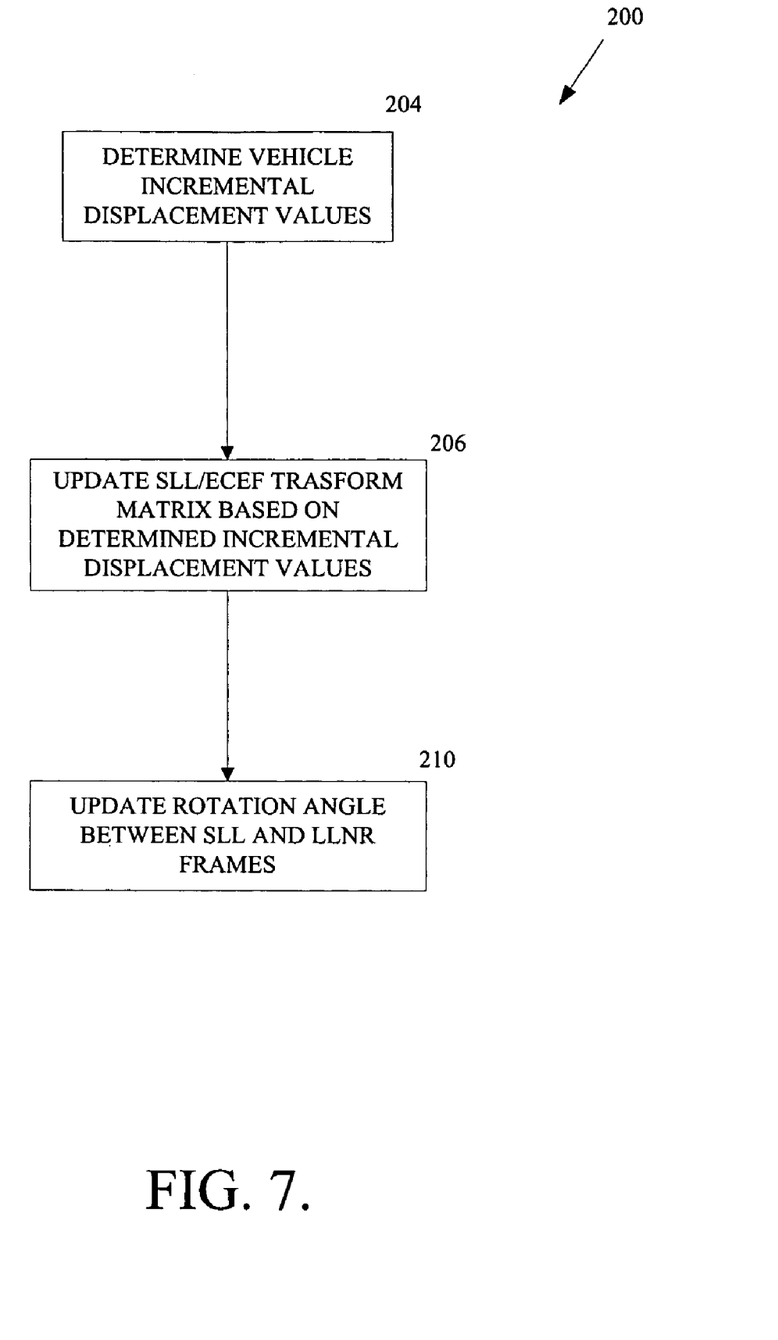

As shown in FIG. 7, a process 200 is shown for updating the rotation angle about the vertical direction (block 108, FIG. 3). First, at a block 204, vehicle incremental displacement values are determined. At a block 206, the SLL/ECEF transform matrix is updated based on the determined incremental displacement values. Then, at block 210, the rotation angle between SLL and LLNR frames is updated.

The rotation angle is used for performing geometric calculations with the terrain elevation map, such as those done for the Volumetric Buffer radar processing and for display. For display, the terrain elevation map is preferably oriented with respect to true north. The rotation angle indicates how much to rotate the terrain elevation map when processing it for display.

Mathematical Description

Locations in a map plane include two-dimensional coordinates ($\xi$, $\eta$), where $\xi$ and $\eta$ represent distances in a display plane in orthogonal directions. On a curved earth surface, the ($\xi$, $\eta$) coordinates correspond to arc lengths along the mean surface of the earth. Therefore, the ($\xi$, $\eta$) coordinates map into angle coordinates ($\phi$, $\theta$) via the following relations:

$$\theta = \frac{\eta}{r_{earth}}, \quad \phi = \frac{\xi}{r_{earth}} \tag{1}$$

where $r_{earth}$ is the mean earth radius.

A z-axis points in the local vertical direction, a position vector $[x,y,z]^T$ of a point in the display plane defined by the coordinates ($\xi$, $\eta$) is calculated as follows:

$$\begin{bmatrix} x \\ y \\ z \end{bmatrix} = \begin{bmatrix} \cos\theta \sin\phi \\ \sin\theta \\ \cos\theta \cos\phi \end{bmatrix} \tag{2}$$

where $\phi$ and $\theta$ are obtained from $\xi$ and $\eta$ using Equation (1). The position defined in Equation (2) is normalized by the radius of the earth. From Equation (2) ξ signifies an arc length in the x direction, and η signifies an arc length in the y direction.

A reference frame where the z-axis is in the local vertical direction is selected. An example of a commonly used reference frame is the local-level north referenced (LLNR) frame. FIG. 5 illustrates the orientation of the LLNR with respect to an earth-centered earth-fixed (ECEF) reference frame.

A position vector in the ECEF frame is obtained from the following.

$$\begin{bmatrix} x \\ y \\ z \end{bmatrix}_{ECEF} = \begin{bmatrix} \cos\Theta \sin\Phi \\ \sin\Theta \\ \cos\Theta \cos\Phi \end{bmatrix} \quad (3)$$

where $\Theta$ is the latitude, and $\Phi$ is the longitude. The latitude and longitude are calculated as follows:

$$\Theta = \sin^{-1} y_{ECEF}, \quad \Phi = \arctan(z_{ECEF}, x_{ECEF}) \quad (4)$$

where $x_{ECEF}$, $y_{ECEF}$, and $z_{ECEF}$ are the components of the position vector in the ECEF frame, and arctan(x,y) is a four quadrant arctangent function.

At this point, we can calculate position vectors in the LLNR frame from curvalinear coordinates (ξ, η) using Equations (1) and (2), and we can calculate latitude and longitude from the position vector defined in the ECEF frame. What is missing is a means of transforming the position vector defined in the LLNR to a position vector defined in the ECEF. We can accomplish this by performing the following operation:

$$\begin{bmatrix} x \\ y \\ z \end{bmatrix}_{ECEF} = A_{LLNR/EF} \begin{bmatrix} x \\ y \\ z \end{bmatrix}_{LLNR} \quad (5)$$

where $[x, y, z]_{ECEF}^T$ describes the location of a point in the ECEF frame, $[x, y, z]_{LLNR}^T$ describes the location in the LLNR frame and $A_{LLNR/EF}$ is the transformation matrix given by $$A_{LLNR/EF} = \begin{bmatrix} \cos\Phi & -\sin\Theta \sin\Phi & \cos\Theta \sin\Phi \\ 0 & \cos\Theta & \sin\Theta \\ -\sin\Phi & -\sin\Theta \cos\Phi & \cos\Theta \cos\Phi \end{bmatrix} \quad (6)$$

where $\Theta$ is the latitude of the vehicle, and $\Phi$ is the longitude of the vehicle.

Databases of terrain elevation are provided in the form of sample points with respect to a reference frame fixed to the earth. These samples are provided as samples with some spacing in latitude and longitude. In order to get a terrain elevation map with a proper spatial relationship between sample points, we need to be able to calculate latitude and longitude for points sampled in (ξ, η) space.

The operations to perform this task are as follows. For each of the points sampled in (ξ, η), the application of Equations (1) and (2) results in the position vector in the LLNR. The position vector is then multiplied by the transformation matrix (Equations (5) and (6)) to give the position vector in the ECEF frame. These coordinates are then applied to Equation (4) to get the latitude and longitude of the sample point. Using latitude and longitude, the terrain elevation is extracted from the terrain database. The result is a terrain elevation map with the proper spatial relationships between sample points.

In an alternate embodiment, the processor 30 augments the terrain elevation map only along its leading edges as the vehicle moves, thereby, eliminating regenerating the entire terrain elevation map. This embodiment ensures that the rows and columns of the map that are generated are valid (i.e., sufficiently accurate) during the entire time it takes for the vehicle to traverse the map. However, performing this type of incremental update using the LLNR reference frame is not practical since maintaining the orientation with true north requires the rotation of the reference frame, and so the rotation of the rows and columns of the map. However, maintaining the terrain map in a different reference frame can allow the desired incremental updating.

This new reference frame is similar to the LLNR in that the z-axis is in the local vertical direction. However, the new reference frame is not referenced to north, but instead is in a sense "stabilized" so that there is no rotation. This new reference frame will be referred to as the Stabilized Local Level (SLL) frame.

The use of the SLL frame is accomplished by maintaining the SLL-to-ECEF transformation matrix. Then the computation of terrain elevation map points is performed in a manner similar to the procedure described above, but with the SLL-to-ECEF transform matrix used in place of the LLNR-to-ECEF transform.

The SLL-to-ECEF transform matrix $A_{SLL/EF}$ is initialized to be equal to $A_{LLNR/EF}$, which is calculated from the vehicle's latitude and longitude using Equation (6). However, whereas the $A_{LLNR/EF}$ matrix is updated at some time interval by recalculation using the vehicle's new latitude and longitude, the update of the SLL-to-ECEF transform is accomplished by performing an incremental rotation of the SLL frame by rotation angles defined in the SLL frame. These rotation angles are obtained by accumulating the vehicle distance traveled since the last update using data from the navigation system 32. This results in an integral displacement of δξ and δη defined in the SLL frame. δξ and δη are easily calculated using data from a navigation system. However, because the SLL is incrementally rotated with respect to the LLNR, the calculation of δξ and δη from navigation system data must take into account the rotation angle. Initially, the incremental rotation angle is zero, because the SLL is initially the same as the LLNR. As the vehicle travels, the rotation angle deviates from zero, so it is necessary to calculate the rotation angle as part of the processing. The calculation of the rotation angle is described later in this document.

Given the incremental displacements δξ and δη since the last update, the incremental rotation angles for the update are calculated by dividing by the radius of the earth, giving:

$$\delta\theta = \frac{\delta\eta}{r_{earth}}, \quad \delta\phi = \frac{\delta\xi}{r_{earth}} \quad (7)$$

These incremental rotations are then used to rotate the SLL frame, resulting in a new SLL-to-ECEF transform obtained from the following calculation.

$$(A_{SLL/EF})_{next} = \quad (8)$$

$$(A_{SLL/EF})_{previous} \begin{bmatrix} \cos\delta\phi & -\sin\delta\theta\sin\delta\phi & \cos\delta\theta\sin\delta\phi \\ 0 & \cos\delta\theta & \sin\delta\theta \\ -\sin\delta\phi & -\sin\delta\theta\cos\delta\phi & \cos\delta\theta\cos\delta\phi \end{bmatrix}$$

While the LLNR frame is forced to have the z-axis directed through the vehicle position in the local up direction, it is possible for errors to build up as the process given in Equation (8) is iteratively applied. The build-up of errors results if the SLL z-axis drifting away from the vehicle position. However, the SLL frame can be "locked" to the vehicle by calculating the following difference vector after each update:

$$\Delta = A_{SLL/EF}^T A_{LLNR/EF} \begin{bmatrix} 0 \\ 0 \\ r_{earth} \end{bmatrix} - \begin{bmatrix} 0 \\ 0 \\ r_{earth} \end{bmatrix} \quad (9)$$

The matrix product $A^T_{SLL/EF}A_{LLNR/EF}$ gives the LLNR-to-SLL transform. Therefore, the vector $\Delta$ is equal to the vector difference between the z-axis in the LLNR (which points to the vehicle position) transformed to the SLL, and the z-axis in the SLL. This is essentially the residual vehicle position error in the SLL after the update. The SLL is kept "locked" to the vehicle by setting the aircraft incremental displacement after the update to values derived from $\Delta$ as follows: $\delta\xi$=the x component of $\Delta$, $\delta\eta$=the y component of $\Delta$. Then the navigation system data is used to accumulate additional contributions to these incremental displacements until the next SLL frame update.

The navigation system 32 typically provide heading and velocity vector data referenced to true north. However for use with the SLL, heading and track angles referenced to a principal axis in the SLL frame (the y-axis for example) are used. Therefore, the rotation angle between the SLL and LLNR frames are determined for transforming velocity and heading in the LLNR (from navigation sensors) to velocity and heading in the SLL. In one embodiment, the rotation angle between the SLL and LLNR frames is obtained by calculating the orientation of north (i.e., the LLNR frame y-axis) in the SLL frame as follows:

$$\begin{bmatrix} x \\ y \\ z \end{bmatrix}_{SLL} = A_{SLL/EF}^T A_{LLNR/EF} \begin{bmatrix} 0 \\ 1 \\ 0 \end{bmatrix} \quad (10)$$

The rotation angle is obtained from the x and y components by $$\gamma = \arctan(x_{SLL}, y_{SLL}) \quad (11)$$

Then to determine the corresponding angle to use for navigation within the SLL frame, the angle $\gamma$ should be added to the north-referenced angle obtained from the navigation system, so that $$\phi_{SLL} = \phi_{LLNR} + \gamma \quad (12)$$

where $\phi_{SLL}$ is a bearing angle (i.e., heading or track angle) in the SLL frame and $\phi_{LLNR}$ is the corresponding true north referenced bearing obtained from a navigation system. The rotation angle $\gamma$ calculated at the update time and used during the period between updates.

While the preferred embodiment of the invention has been illustrated and described, as noted above, many changes can be made without departing from the spirit and scope of the invention. For example, the steps performed in the processes above may be performed in various order without departing from the scope of the invention. Accordingly, the scope of the invention is not limited by the disclosure of the preferred embodiment. Instead, the invention should be determined entirely by reference to the claims that follow.

What is claimed is:

1. A method for generating a terrain elevation map in proximity to a vehicle, the method comprising:
retrieving terrain elevation data based on aircraft position information generated by a navigation component; and
generating a Cartesian coordinate-referenced terrain elevation map based on the retrieved terrain elevation data and the aircraft position information received from the navigation component, wherein generating the terrain elevation map comprises:
initializing the terrain elevation map;
updating the initialized terrain elevation map; and
updating a rotation angle of the terrain elevation map.

2. The method of claim 1, further comprising saving the generated terrain elevation map in a database.

3. The method of claim 1 further comprising:
sending the generated terrain elevation map to a display processor; and
generating a map image for display based on the sent terrain elevation map.

4. The method of claim 1, further comprising sending the terrain elevation map to the navigation component, wherein the navigation component comprises a ground proximity warning component for generating one or more of a ground proximity caution or warning based on the received terrain elevation map.

5. The method of claim 1, further comprising:
sending the terrain elevation map to the navigation component;
generating navigation signals at the navigation component based on the received terrain elevation map; and
sending the generated navigation signals to one or more navigation units for presentation.

6. The method of claim 1, further comprising sending the terrain elevation map to a radar system.

7. The method of claim 6, further comprising generating a volumetric buffer based on the terrain elevation map and radar signals generated by the radar system.

8. The method of claim 1, wherein initializing the terrain elevation map comprises:
setting a stabilized transform matrix equal to a north referenced transform matrix;
setting a rotation angle between a north referenced frame and a stabilized frame equal to zero;
calculating each position of the cells of an earth centered earth fixed referenced frame;
calculating latitude and longitude for each of the cells in the earth centered earth fixed referenced frame; and
mapping terrain elevation data into a terrain elevation map referenced to the stabilized frame based on the calculated latitude and longitude and the stabilized transform matrix.

9. The method of claim 8, wherein updating the terrain elevation map comprises:
determining if the vehicle has moved a distance at least one of greater than or equal to a threshold amount; and adding at least one other row or column of terrain elevation data to the terrain elevation map if the vehicle was determined to move at least one of greater than or equal to the threshold amount.

10. The method of claim 8, wherein updating the rotation angle comprises:
   determining incremental displacement values of the vehicle; and
   updating the rotation angle between the stabilized frame and the north referenced frame based on the determined incremental displacement values.

11. The method of claim 10, wherein updating the rotation angle comprises generating a stabilized transform matrix based on the incremental displacement values.

12. A computer program product for generating a terrain elevation map relative to a vehicle, the product comprising:
   a component for retrieving terrain elevation data based on aircraft position information generated by a navigation component; and
   a component for generating a Cartesian coordinate-referenced terrain elevation map based on the retrieved terrain elevation data and the aircraft position information received from the navigation component, wherein the component for generating the terrain elevation map comprises:
      a component for initializing the terrain elevation map;
      a component for updating the initialized terrain elevation map; and
      a component for updating a rotation angle of the terrain elevation map.

13. The product of claim 12, further comprising a component for saving the generated terrain elevation map in a database.

14. The product of claim 12, further comprising:
   a component for sending the generated terrain elevation map to a display processor; and
   a component for generating a map image for display based on the sent terrain elevation map.

15. The product of claim 12, further comprising a component for sending the terrain elevation map to the navigation component, wherein the navigation component comprises a ground proximity warning component for generating one or more of a ground proximity caution or warning based on the received terrain elevation map.

16. The product of claim 12, further comprising:
   a component for sending the terrain elevation map to the navigation component;
   a component for generating navigation signals at the navigation component based on the received terrain elevation map; and
   a component for sending the generated navigation signals to one or more navigation units for presentation.

17. The product of claim 12, further comprising a component for sending the terrain elevation map to a radar system.

18. The product of claim 17, further comprising a component for generating a volumetric buffer based on the terrain elevation map and radar signals generated by the radar system.

19. The product of claim 12, wherein the component for initializing the terrain elevation map comprises:
   a component for setting a stabilized transform matrix equal to a north referenced transform matrix;
   a component for setting a rotation angle between a north referenced frame and a stabilized frame equal to zero;
   a component for calculating each position of the cells of a centered earth fixed referenced frame;
   a component for calculating latitude and longitude for each of the cells in the earth centered earth fixed referenced frame; and
   a component for mapping terrain elevation data into a terrain elevation map referenced to the stabilized frame based on the calculated latitude and longitude and the stabilized transform matrix.

20. The product of claim 19, wherein the component for updating the terrain elevation map comprises:
   a component for determining if the vehicle has moved a distance greater than a threshold amount; and
   a component for adding at least one other row or column of terrain elevation data to the terrain elevation map if the vehicle was determined to move at least one of greater than or equal to the threshold amount.

21. The product of claim 19, wherein the component for updating the rotation angle comprises:
   a component for determining incremental displacement values of the vehicle; and
   a component for updating the rotation angle between the stabilized frame and the north referenced frame based on the determined incremental displacement values.

22. The product of claim 21, wherein a component for updating the rotation angle comprises a component for generating a stabilized transform matrix based on the incremental displacement values.

23. A system for generating a terrain elevation map relative to a vehicle, the system comprising:
   memory for storing terrain elevation data;
   a navigation component for generating aircraft position information; and
   a processor in communication with the memory and the navigation component, the processor comprising:
      a component for retrieving terrain elevation data from the memory based on the generated aircraft position information; and
      a component for generating a Cartesian coordinate-referenced terrain elevation map based on the retrieved terrain elevation data and the aircraft position information, wherein the component for generating the terrain elevation map comprises:
         a component for initializing the terrain elevation map;
         a component for updating the initialized terrain elevation map; and
         a component for updating a rotation angle of the terrain elevation map.

24. The system of claim 23, wherein the processor further comprises a component for saving the generated terrain elevation map in the memory.

25. The system of claim 23, further comprising:
   a display processor in communication with the processor, the display processor generates a map image.

26. The system of claim 23, wherein the navigation component comprises a ground proximity warning component for generating one or more of a ground proximity caution or warning based on the received terrain elevation map.

27. The system of claim 23, wherein the navigation component comprises:
   a component for generating navigation signals based on the received terrain elevation map, and
   a component for presenting at least a portion of the generated navigation signals.

28. The system of claim 23, further comprising a radar system for generating a volumetric buffer based on the terrain elevation map and radar signals generated by the radar system.

29. The system of claim 23, wherein the component for initializing the terrain elevation map comprises:
   a component for setting a stabilized transform matrix equal to a north referenced transform matrix;
   a component for setting a rotation angle between a north referenced frame and a stabilized frame equal to zero;
   a component for calculating each position of the cells of a centered earth fixed referenced frame;
   a component for calculating latitude and longitude for each of the cells in the earth centered earth fixed referenced frame; and
   a component for mapping terrain elevation data into a terrain elevation map referenced to the stabilized frame based on the calculated latitude and longitude and the stabilized transform matrix.

30. The system of claim 29, wherein the component for updating the terrain elevation map comprises:
   a component for determining if the vehicle has moved a distance greater than a threshold amount; and
   a component for adding at least one other row or column of terrain elevation data to the terrain elevation map if the vehicle was determined to move at least one of greater than or equal to the threshold amount.

31. The system of claim 29, wherein the component for updating the rotation angle comprises:
   a component for determining incremental displacement values of the vehicle; and
   a component for updating the rotation angle between the stabilized frame and the north referenced frame based on the determined incremental displacement values.

32. The system of claim 31, wherein a component for updating the rotation angle comprises a component for generating a stabilized transform matrix based on the incremental displacement values.

* * * * *